April 17, 1951  G. A. COLLENDER  2,548,949
POWER TRANSMISSION FOR DUAL WHEEL UNITS OF VEHICLES
Original Filed Nov. 23, 1945  3 Sheets—Sheet 2

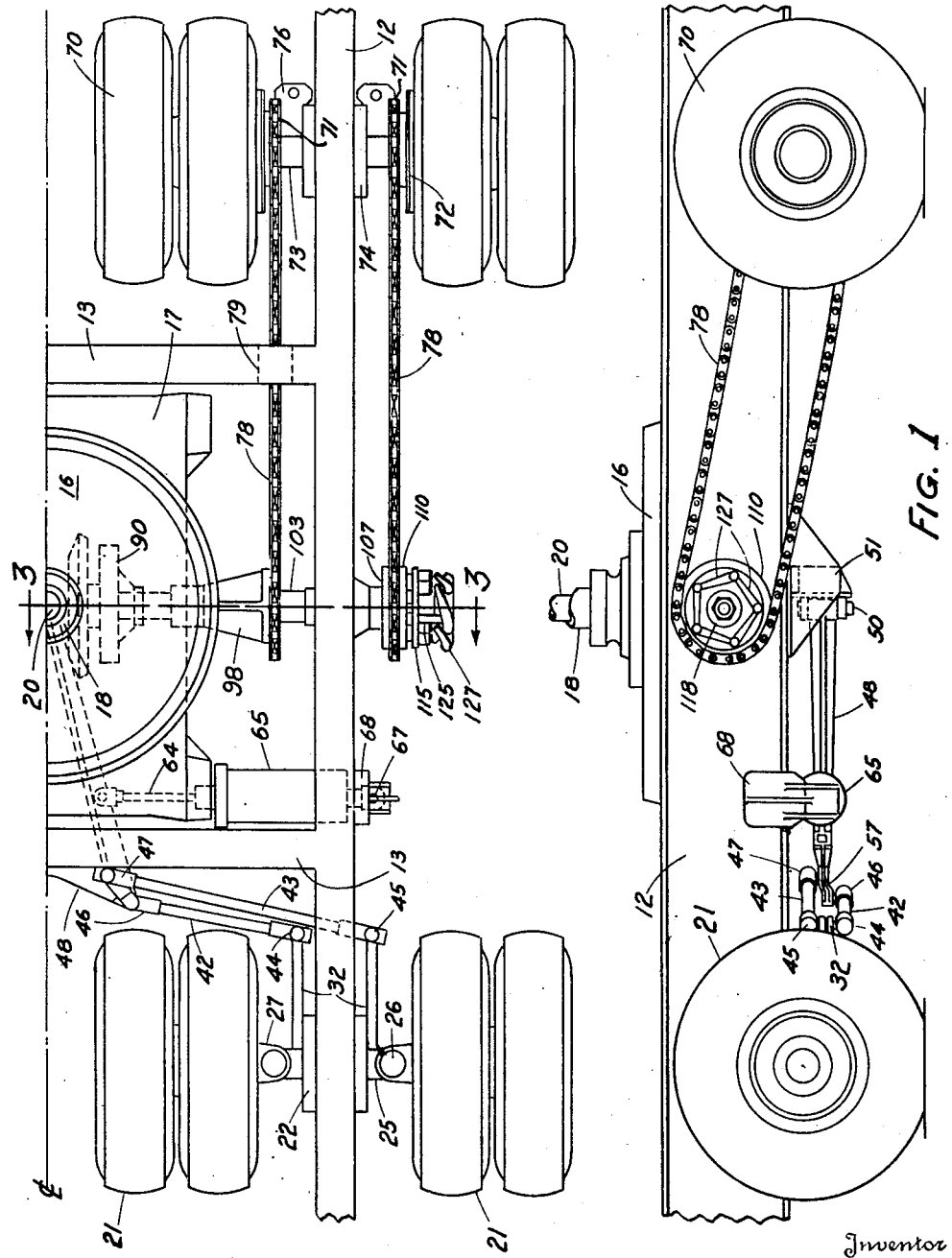

Inventor
Gustave A. Collender
By Ralph L. Stevens
Attorney

April 17, 1951   G. A. COLLENDER   2,548,949
POWER TRANSMISSION FOR DUAL WHEEL UNITS OF VEHICLES
Original Filed Nov. 23, 1945   3 Sheets-Sheet 3

Inventor
Gustave A. Collender
By Ralph L. Stevens
Attorney

Patented Apr. 17, 1951

2,548,949

UNITED STATES PATENT OFFICE 2,548,949

POWER TRANSMISSION FOR DUAL WHEEL UNITS OF VEHICLES

Gustave A. Collender, Los Angeles, Calif., assignor to Six Wheels, Inc., Los Angeles, Calif., a corporation of California Original application November 23, 1945, Serial No. 630,286. Divided and this application April 21, 1947, Serial No. 742,922

3 Claims. (Cl. 180—22)

This invention relates to power transmission mechanisms, especially such as are suitable for driving the wheels of a vehicle.

More particularly, my invention is concerned with improved means for differentially driving two or more wheel units or assemblies that frequently are required to rotate at relatively different speeds.

The present invention contemplates a vehicle drive embodying two or more pairs of independently rotatable wheel units, all driven from a common source of power. In the preferred design these wheel units are aligned laterally of the rear end of the vehicle, but the pairs might consist of tandem wheels, and the units of each pair might even in extraordinary cases be at opposite ends of the vehicle.

The apparatus of this invention is designed to eliminate the conventional automatic differential gearing, and to substitute either a set of manually controlled clutches or a set of automatic friction couplings, or both. The apparatus is particularly adapted for use in association with chain drives, but is not limited thereto.

It follows, therefore, that the primary object of my invention is to devise an improved power transmission of the type generally described above, especially for use in vehicles. This and some subordinate objects should readily appear from a study of the following detailed description when taken in conjunction with the accompanying drawings.

This application is a division of a copending application, Serial No. 630,286, which has matured into Patent No. 2,519,742, August 22, 1950, filed November 23, 1945, for "Heavy Duty Multiple-Wheeled Vehicles," and the figures of the drawings correspond with some of those in that case. In the present drawings:

Fig. 1 is a side elevational view of a crane undercarriage embodying a preferred form of the present invention.

Fig. 2 is a top plan view of one half of the vehicle of Fig. 1, divided by a vertical plane passed through the longitudinal center of the vehicle.

Fig. 2 is an enlarged view, chiefly in vertical section, of one of the chain-driving jackshaft assemblies and its primary driving means, taken along the line 3—3, of Fig. 2.

Figure 3:
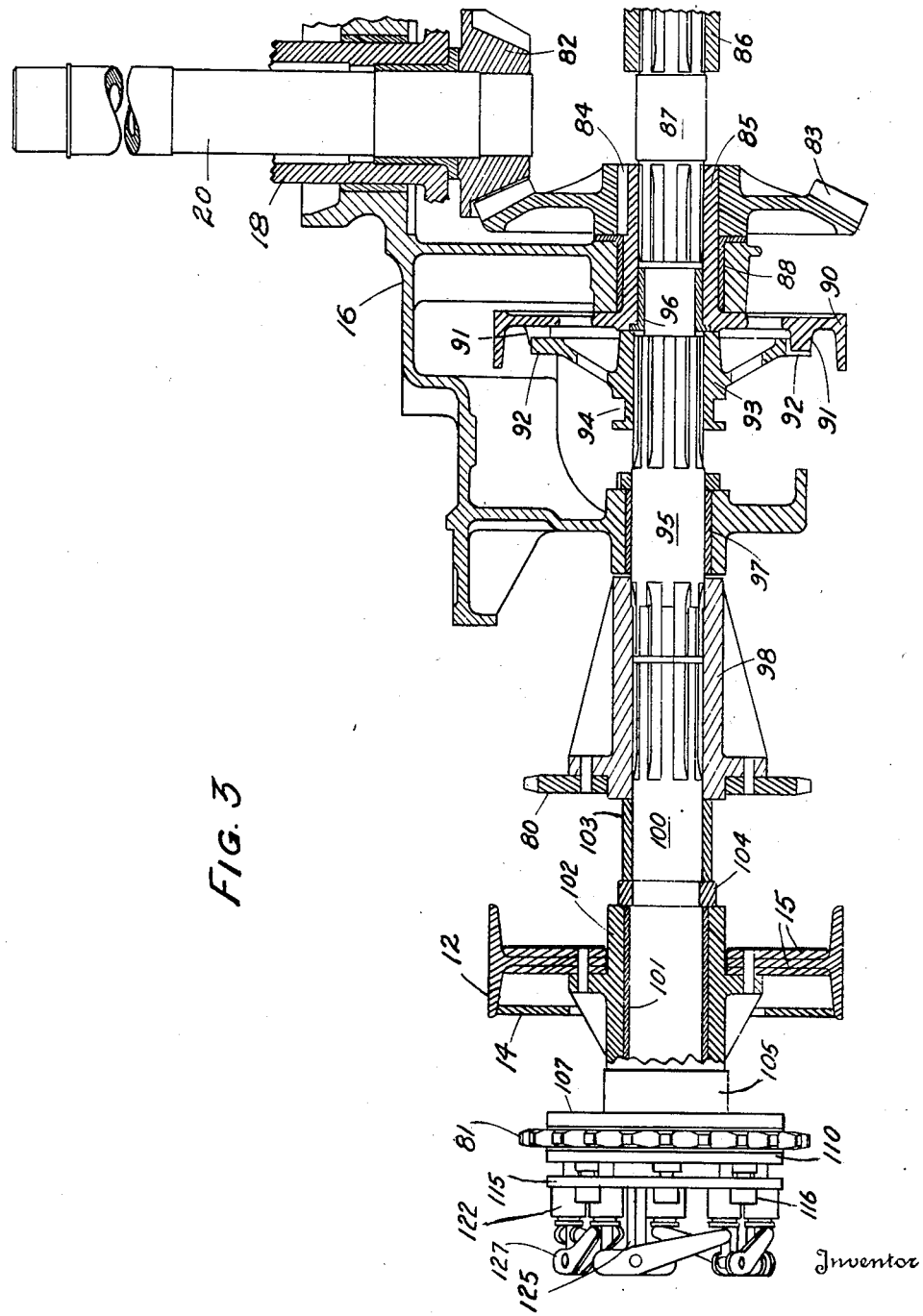

With continued reference to the drawings, and particular reference first to Figs. 1 to 3, the vehicle framework comprises a pair of longitudinal members 12 interconnected by a plurality of cross members, including members 13. Each member 12 is in the form of an I-beam, and at its outer side is strengthened by an elongated plate 14 that may be welded thereto. The zones between the cross members 13 may be further reenforced by plates 15 which fit snugly against the bottoms of the I-beam channels. This framework supports in conventional manner a bull wheel 16 and its platform 17 for cooperation with a crane superstructure, not shown. The bull wheel surrounds a central sleeve 18 which in turn affords bearing support to a vertical hollow propeller shaft 20 that can be driven from the crane power plant in the superstructure.

Each side of the front end of the vehicle is supported by a pair of wheel units 21 through the medium of a bracket 22 secured to the frame and mounted upon a rocking beam 25. The wheel units carry yokes 27 pivotally connected to the beam ends by king pins 26. The yokes are rigidly united to a pair of steering arms 32. All of these parts and the steering mechanism about to be described, are better shown in my aforesaid copending application. They form no part of the present invention and are included only to afford an adequate disclosure.

The rear ends of each pair of the steering arms 32 are connected to links 42 and 43 by conventional ball joints 44, 45; and the links in turn are connected by further ball joints 46, 47 to a forward corner portion 57 of a special wishbone plate 48. The apex of the plate 48 is pivotally connected by a vertical pin 50 to a bracket 51 that is secured in the medial plane of the vehicle at a point directly below the bull wheel center.

Horizontal swinging motion of the plate 48 to right or to left causes steering of the front wheels. This may be accomplished by inserting a conventional servo-motor 65 of the piston and cylinder type between one side of the plate and one side of the chassis frame. The visible end of the piston rod 64 is pivotally connected to the plate, and the outer end of the cylinder is pinned at 67 to a portion of a bracket 68. A fluid source, not shown, of course must be connected to the motor in such manner as to afford selective operation.

The rear end of the vehicle framework is supported by four dual wheel units 70, non-dirigible and each carrying a sprocket plate 71 to afford traction. The wheels of each unit and also its sprocket plate are secured to a brake drum 72 that is rotatably mounted upon one end of a rocking beam 73 that is connected to a frame-carried bracket 74. Each rocker 73 carries a pair of pads 76 for the mounting of conventional brake operating motors and linkages (not shown).

The driven sprockets 71 at each side of the vehicle are engaged by a pair of chains 78 that extend forwardly—one of them through a hole 79 in the rear cross member 13—to encompass two complemental sprocket plates 80 and 81 that are mounted on a jackshaft assembly about to be described.

A pinion 82 is secured to the lower end of the propeller shaft 20, and meshes with a bevel gear 83 that is keyed at 84 to a sleeve 85 to rotate the latter in a zone at one side of the vertical central plane of the vehicle. A similar sleeve 86 is disposed at the other side of the central plane, but there is no second bevel gear to drive it since it receives its torque through a splined coupling with the sleeve 85. In all other respects the jackshaft housing assembly partially shown in Fig. 3 is identical at opposite sides of the vertical longitudinal plane that passes through the axis of the propeller shaft 20.

The sleeves 85 and 86 have frame-supported bearings 88, and have integral radial spiders 90 equipped with rings of clutch dogs 91 that face laterally outwardly. These dogs on each spider are complemental to a plurality of spaced fingers 92 formed upon and extending radially from a hub 93 that has a peripheral groove for coaction with a conventional clutching and declutching fork (not shown). The hub 93 is slidably splined upon a shaft 95 that is rotatable in frame-supported bearings 96 and 97.

Each hub 93 may be selectively moved into and out of locking engagement with its adjacent spider 90 by any suitable arrangement of servo-motors and forks such, for example, as disclosed in my copending application, Ser. No. 567,330, filed December 9, 1944, now abandoned. The purpose of these clutches is to permit either pair of traction wheel units (at one side or the other of the vehicle) to be driven to the exclusion of the other pair, thus to facilitate steering the vehicle on sharp turns or when the supporting terrain renders steering difficult even for gradual turns. Of course the clutches can be simultaneously engaged for normal travel.

Each sprocket plate 80 is bolted to a heavy sleeve 98 that is in splined connection at one end with its adjacent shaft 95, and that is similarly connected at its other end to a shaft 100 to drive the latter. The shaft 100 has a bearing 101 in the region of the reenforced side frame member and projects outwardly therebeyond to drive the sprocket 81 through a coupling mechanism about to be described. The bearing 101 is telescoped in a sleeve 102 that is bolted to the frame structure, as shown. The sleeves 98 and 102 are separated by spacers 103, 104. The shafts 95 and 100 could be made in one piece, but preferably are separate for maximum strength and for convenience of assembly.

Figure 4:
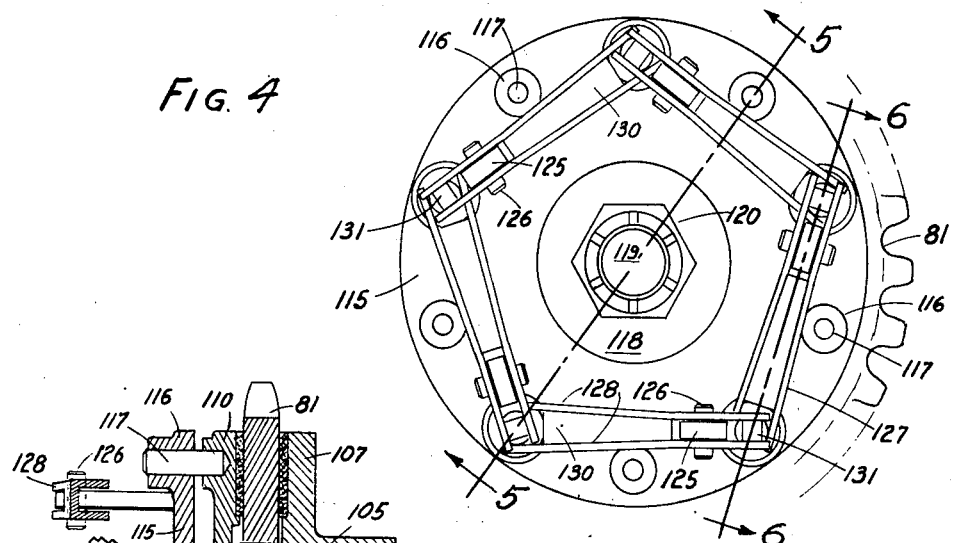
Fig. 4 is an enlarged face view of the differential unit of Fig. 3 and as seen when looking towards the right hand end thereof.
Figure 5:
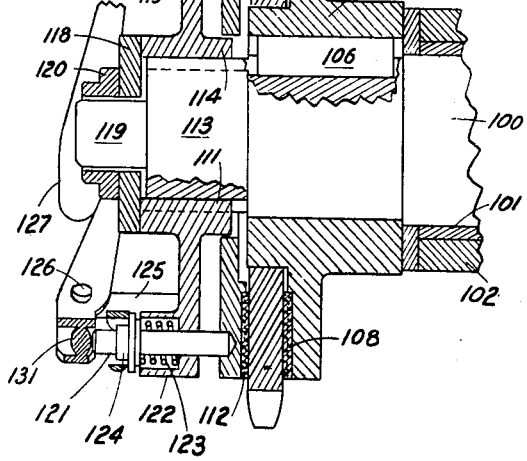
Fig. 5 represents a cross section taken on line 5—5, Fig. 4.
Figure 6:
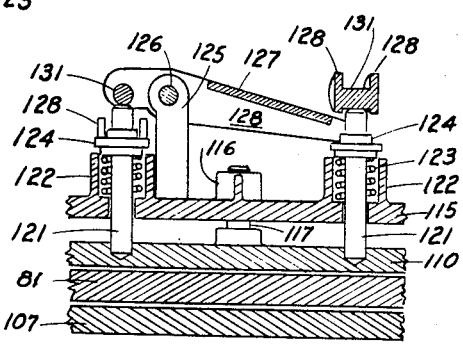
Fig. 6 is a sectional view taken on the plane of line 6—6, Fig. 4.

With reference now chiefly to Figs. 4 to 6, each shaft 100 is surrounded near its outer end by a hub 105 that is keyed thereto at 106. The hub has a radial flange 107 disposed slightly inward from its outer end to form a cylindrical seat for the sprocket plate 81, relative rotation between these parts being possible. The flange is recessed to receive a flat annular ring 108 formed of clutch lining or any other suitable material that can be used satisfactorily in a friction coupling. A floated pressure plate 110 at the opposite face of the sprocket plate is likewise recessed to receive a similar coupling ring, 112.

Just outward of the plate 110, the shaft 100 has a reduced portion 113 surrounded by a sleeve 114 which is non-rotatable but slidable thereon by virtue of keys 111 which afford an axial slip fit. This sleeve has an integral radiating flange 115 which at its rim is provided with a plurality of spaced, outwardly facing bosses 116 which ride freely and slidably upon a corresponding number of pins 117 that are driven into tight fitting sockets in the plate 110, as shown. These pins 117, which serve to float the plate 110, preferably are five in number, as also are the pressure applying instrumentalities presently described, but the number may vary slightly.

The sleeve 114 is engaged by a large washer-like disc 118, which loosely surrounds a greatly reduced and threaded extremity 119 of the shaft 100; and this disc is retained and pressed against the sleeve by a nut 120, screwed onto the extremity 119. The nut is adjustable to vary the degree of frictional engagement between the facings 108, 112 and the sprocket plate 81, subject to modification and equalization of frictional resistances caused by other mechanism, as follows.

Adjacent each socket 122, the flange 115 has an integral post 125 of such length that it projects outwardly beyond the outer ends of the pins 121. These posts are five in number and equally spaced apart; and each has a flat sided head pierced laterally to carry a pin 126 upon which is pivotally mounted a lever 127 of such length that its ends bridge the space between the two most adjacent pins 121 in chordal fashion. Each lever preferably is formed of heavy sheet metal, as by stamping or pressing to produce a pair of elongated spaced sidewalls 128, partially joined by an integral body plate 130. The sidewalls receive the ends of the pin 126, and at that end closer to the pivot they straddle and are welded to a small block 131 which freely contacts the outer end of an adjacent pin 121. The other ends of the sidewalls diverge somewhat and are lesser in width so that they may be projected under one of the blocks 131 to straddle the outer end of a pin 121 and slidably engage the outer side of that bushing 124 which surrounds said pin.

Thus there are five of the pressure applying and equalizing devices comprising the chordally arranged lever units 127, with one end of each reacting positively against the pressure plate 110 through a pin 121, and the other end acting upon said plate through a resilient compression spring 123. The action of each spring is multiplied about five times, as can be seen from the relative lengths of the arms into which each lever 127 is divided by its pivot pin 126. The forces thus exerted by the pins 121 upon the plate 110 are equalized and cause the plate to apply well balanced pressure against the friction rings 108, 112, so that there can be no localized or excessive wear of the latter. The nut 120 affords ready adjustment to select a desired pressure and to compensate for wear.

Generally speaking, the primary purpose of the friction coupling is to permit the use of many laterally separated wheels without excessive drag and wear upon the rubber tires. In the rear end construction, at each side of the vehicle, the inside dual wheel unit 70 is always positively driven from its sprocket 80 (when the clutch elements 91 and 92 are interlocked), but the outside dual wheel unit may rotate at a different speed due to slippage in the coupling unit that confines the sprocket 81. This differential action is primarily useful when the vehicle is turning, but frequently is beneficial under certain ground surface conditions, such as uneven or boggy surfaces.

The general operation, and the modes of functioning of the various units are believed to be clear from the preceding running description. Obviously, numerous changes in the mechanisms and their parts may be made without departing from the spirit of the present invention. Also, although they are designed primarily for use in a crane carriage they are readily adaptable to numerous other uses. Therefore, I wish to be limited, as is customary, only by a reasonably liberal interpretation of the scope of the appended claims.

I claim:

1. In a vehicle chassis, a framework; and a driving mechanism at each side thereof, each driving mechanism comprising: a pair of independently rotatable wheel units arranged in parallelism with their axes on a line transverse to the chassis, a transversely mounted rotatable shaft unit, a power take-off device positively driven by said shaft unit and connected to one of said wheel units, and a second take-off device driven by said shaft unit and embodying a self operating friction coupling connected to the other wheel unit; and means for positively driving said shaft units.

2. In subcombination, a chassis framework comprising longitudinal side members having a gear mounting structure supported therebetween, a transversely disposed jackshaft assembly comprising a shaft journaled in said mounting structure and designed to be driven, a second shaft extending through and journaled in one of said side members in alignment with the first named shaft, a sleeve receiving the proximate ends of said shafts to interlock them, a sprocket wheel rigidly joined to said sleeve, and a friction coupling comprising a radially flanged sleeve secured to said second shaft, a sprocket wheel surrounding said sleeve outside of and relatively rotatable with respect to the sleeve flange, a plate unit slidable axially upon the extreme outer end of said second shaft, and means for urging said plate unit towards said sleeve flange.

3. In a vehicle chassis, a framework comprising two longitudinal side members and a rigid structure affording a bearing adjacent the medial center line of said chassis, a propeller shaft journaled in said bearing, an axle shaft unit journaled through each side member and through said structure, a pair of mechanical clutch elements also journaled in said structure and drivingly engaged with said propeller shaft, a second pair of clutch elements nonrotatively mounted upon said shaft units and relatively slidable axially thereof with respect to the first mentioned clutch elements, and power take-off devices in the form of dual units connected to said shaft units, each duel unit comprising a member positively connected to its shaft unit at the inner side of the corresponding longitudinal frame member and a frictional coupling to said shaft unit at the outer side of said corresponding longitudinal frame member.

GUSTAVE A. COLLENDER.

REFERENCES CITED

The following references are of record in the file of this patent:

UNITED STATES PATENTS

| Number | Name | Date |
| --- | --- | --- |
| 1,337,510 | Frankman | Apr. 20, 1920 |
| 1,409,994 | Bement | Mar. 21, 1922 |
| 1,467,196 | Russell | Sept. 4, 1923 |
| 1,494,881 | Baines | May 20, 1924 |
| 1,541,502 | Howe | June 9, 1925 |
| 1,732,626 | Wilson | Oct. 22, 1929 |
| 2,226,759 | Fitzner | Dec. 31, 1940 |
| 2,380,619 | Terrill | July 31, 1945 |
| 2,397,673 | Lewis | Apr. 2, 1946 |

FOREIGN PATENTS

| Number | Country | Date |
| --- | --- | --- |
| 8,961 | Great Britain | 1908 |
| 308,802 | Germany | Oct. 26, 1918 |